Oct. 31, 1950      L. J. BULLIET      2,528,467
SPEED CONTROL SYSTEM FOR ALTERNATING CURRENT MOTORS
Filed Sept. 25, 1944
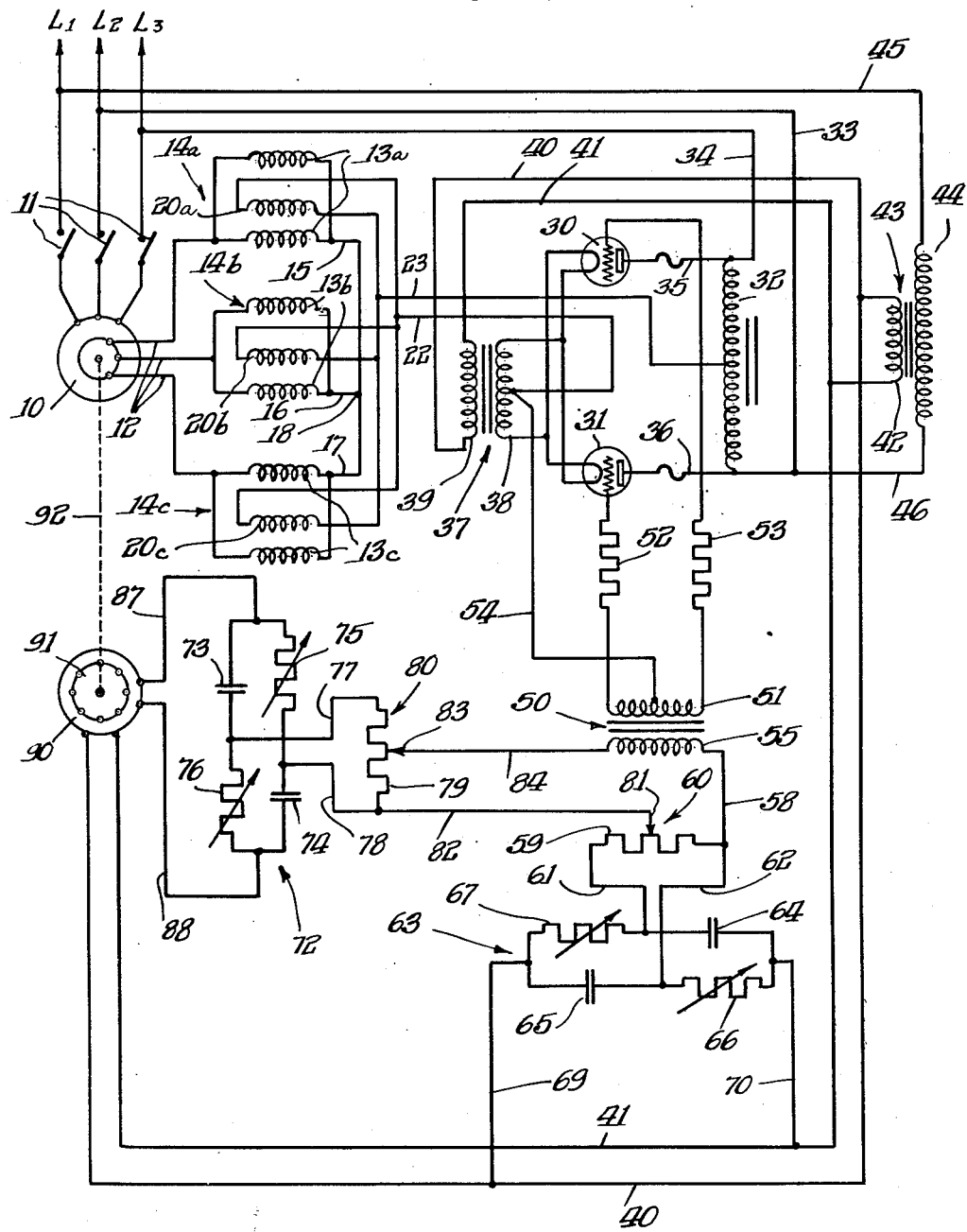
INVENTOR.
Leander Jackson Bulliet
By: Loftus, Moore, Olson & Trexler
attys.

Patented Oct. 31, 1950

2,528,467

UNITED STATES PATENT OFFICE 2,528,467

SPEED CONTROL SYSTEM FOR ALTERNATING CURRENT MOTORS

Leander Jackson Bulliet, Rockford, Ill., assignor to Odin Corporation, Chicago, Ill., a corporation of Illinois Application September 25, 1944, Serial No. 555,624

6 Claims. (Cl. 318—328)

This invention relates to motor control systems, and particularly to means and methods for controlling and regulating the speed of alternating current motors.

It is an object of the invention to provide an improved control system, particularly for regulating and controlling the speed of alternating current motors. More specifically stated, it is an object of the invention to provide a control system of the type defined wherein the speed and the torque of the controlled motor may be more accurately and smoothly regulated, and wherein the control system has improved characteristics of sensitivity and accuracy, in effecting its control functions.

A further object of the invention is to provide a motor control system of the type defined, which can be more readily and economically fabricated and assembled.

Another object of the invention is to provide a motor control system, particularly for alternating current motors, and wherein the control is effected by controlling the impedance and specifically the inductance of a portion of the motor circuit; the system having an improved governor or speed sensitive means for controlling the control circuit, to thereby control the speed and torque characteristics of the motor to be controlled.

Still further objects of the invention are to provide a motor control system of the type defined, wherein the speed sensitive means and the control circuits thereof have alternating current characteristics of operation; and wherein auxiliary, independently speed controlled, governors or speed sensitive devices, and their associated speed control mechanisms, are eliminated.

Various features of the invention will be apparent from the following specification when taken in connection with the accompanying drawing wherein one preferred embodiment is set forth for purposes of illustration.

In the drawing, and as will hereinafter be described, the invention has been illustrated as applied in effecting the speed control of a 3-phase alternating current wound rotor induction motor, the invention being well adapted for such use. It is to be understood, however, that the invention, and various of its principles, may be adapted to other types of control, such for example as the control of other types of alternating current motors, including single phase induction motors and the like. In the particular embodiment illustrated the control is shown applied to the external circuit of the wound rotor, but may of course be applied to other control or supply circuits of the motor, as may be desired.

Referring to the drawing, an alternating current 3-phase source of supply is indicated by the lines $L_1$, $L_2$ and $L_3$, which may for example comprise a conventional 440 volt 60 cycle source, in the particular embodiment illustrated. The power lines are connected to the primary of a wound rotor induction motor 10 through a starting switch 11 by means of which the motor may be connected with or disconnected from the power source. In the embodiment illustrated, as previously indicated, the control of the motor 10 is effected by controlling the impedance and specifically the inductance in the external circuit of the secondary or rotor of the motor. More specifically, the three leads 12 of the rotor are connected to the alternating current coils 13a, 13b and 13c of three saturable reactors 14a, 14b and 14c, the coils being connected at their opposite ends by means of wires 15, 16 and 17 to a common point 18, so that the coils are connected in star or Y as may be understood. The inductance of the alternating current coils of the reactors is controlled by the direct current coils 20a, 20b and 20c connected in parallel to a pair of wires 22 and 23, constituting a controlled source of direct current supply, as presently will be described. As will be understood, variations in current flow within the direct current coils 20a, 20b and 20c of the saturable reactors varies the inductance of the alternating current coils 13a, 13b and 13c, whereby to vary the inductance of the external circuit of the wound rotor of the motor 10, to effect its speed and torque control. Relatively small variations in the current of the direct current coils may be used to readily effect the variation and control of the flow of the currents of greater magnitude within the rotor circuit.

In accordance with the invention the direct current flow within the reactor supply lines 22 and 23 is controlled by a full wave rectifier comprising a pair of thyratrons, or gas-filled conduction tubes 30 and 31. These tubes effect a full wave rectification of the alternating current from the main power source, transmitting a direct current to the reactor supply lines 22 and 23; and also effect the control of the current flow within the supply lines, in accordance with the speed and torque control desired, as will presently be described. The plate voltage for the tubes is derived from the main alternating current power lines through the intermediary of an iron core reactor or coil 32. This coil is connected by means of wires 33 and 34 to the power supply lines L2 and L3 respectively, and by means of wires 35 and 36 to the plates of the tubes. The supply line 23 constitutes a center tap for this coil. The filament voltage or filament heating current for the tubes is derived from a transformer 37, to the secondary coil 38 of which the tube filaments are connected in parallel. The primary coil 39 of the transformer 37 is connected by means of a pair of wires 40 and 41 to the secondary 42 of a transformer 43, the primary coil 44 of which is connected by means of wire 45 and wires 46 and 33 to the main power lines L1 and L2 respectively. Preferably the single phase input from the power lines is reduced by the transformer 43 from 440 volts to 110 volts, in the particular illustrative embodiment set forth, whereas the transformer 37 effects a further voltage reduction from 110 volts to 2½ volts in the particular embodiment shown. The supply line 22 constitutes a center tap connection for the transformer coil 38, as shown.

It will be seen that by reason of the connections provided the tube filaments are heated from the main alternating current power lines, through the intermediary of the transformers 37 and 43; and the coil 32 and the tubes constitute a full wave rectifier whereby single phase alternating current from the lines 33 and 34 may be rectified and transmitted as pulsating direct current to the reactor supply lines 22 and 23.

As previously indicated, the tubes 30 and 31 constitute not only a full wave rectifier, but also a control for the current flow within the supply lines 22 and 23. This control is effected through the action of the tube grid elements, and the control thereof, as will now be described. The tube grids derive their voltage from a grid control transformer 50, the grid elements being connected to the secondary coil 51 of this transformer through a pair of current limiting resistors 52, 53. A wire 54 constitutes a center tap connection between the transformer coils 38 and 51. The primary coil 55 of the transformer 50 is energized by single phase alternating current, controlled as to phase relation and voltage, as will presently be described. It will be seen that the transformer 50, together with the wire 54 and the associated connections described constitute a grid control circuit for controlling the phase relation and voltage of the tube grid elements of the tubes 30 and 31. As will be understood, the protective resistors 52 and 53 are provided for limiting the current flow within the grid circuit, upon the firing of the tubes.

To effect the control of the transformer coil 55, the coil is connected by means of a wire 58 to one end of the resistance 59 of a resistance type voltage divider 60. The resistance 59 is connected by means of a pair of wires 61 and 62 to the output of a phase shifting bridge generally indicated by the numeral 63. This phase shifting bridge comprises a pair of condensers 64 and 65 and a pair of variable resistors 66 and 67, connected as shown. The supply lines 69 and 70 for the bridge are connected, respectively, to the wires 40 and 41 powered from the secondary coil 42 of the transformer 43 previously described. By this means single phase alternating current is supplied to the phase shifting bridge 63 at suitable voltage, for example 110 volts in the particular embodiment illustrated. By simultaneously adjusting the variable resistors 66 and 67, the phase of the output delivered by the bridge to the resistor 59 may be adjusted and controlled, but without variation of the output voltage.

The circuit includes a second phase shifting bridge, generally indicated by the numeral 72, and comprising a pair of condensers 73 and 74, and a pair of variable resistors 75 and 76 connected in a manner and for the purpose previously described in reference to the phase shifting bridge 63. The output lines 77 and 78 of the bridge 72 are connected to the ends of a resistor 79 of the resistance type voltage divider 80, which may be similar in structure to the voltage divider 60 previously described. An adjustable tap connection 81 of the voltage divider 60 is connected by means of a wire 82 to one end of the resistor 79, whereas an adjustable tap connection 83 forming a part of the voltage divider 80 is connected by means of a wire 84 with one end of the transformer coil 55.

The input lines 87 and 88 of the phase shifting bridge 72 are powered from a governor or speed sensitive controller 90 which, because of its function, may be termed a tachometer generator. Structurally the controller 90 is similar to a 2-phase motor, and may for example comprise a squirrel cage rotor mechanically connected to and driven from the rotor of the motor 10, as indicated at 92; and two sets of stator windings, for example in 90° phase relation, one set of windings being connected to the supply lines 87 and 88 for the phase shifting bridge 72, and the other set of windings being connected to the alternating current supply lines 40 and 41, previously described. The field windings of the controller 90 connected to the supply lines 40 and 41 may be refered to as the input windings, whereas the set of windings connected to the wires 87 and 88 may be referred to as the controller output windings, because of their respective functions. The action of the controller 90 is such that the voltage output supplied to the wires 87 and 88 will be proportional to the speed of rotation of the rotor 91; whereas the frequency of the alternating current delivered by the output windings remains invariable and interlocked with the frequency of the alternating current supply lines 40 and 41 which energize the controller input windings. While the current within the input and output windings will generally be out of phase, the phase relationship remains fixed during the operation of the structure. Accordingly the governor or speed sensitive controller 90 constitutes means for generating an alternating current in the supply lines 87 and 88 to the phase shifting bridge 72 at a voltage determined by the speed of operation of the motor 10, but at a frequency the same as and in a fixed phase relation to the alternating current power supply lines 40 and 41.

In the operation of the structure, and to effect the set-up adjustment of the phase of the grid circuits of the tubes 30 and 31, the leads 12 of the motor 10 to be controlled may be shorted so that the motor runs at full speed, thereby driving the controller 90 at its maximum speed whereby to impart a maximum voltage to its output circuit 87, 88. The adjustable tap 83 of the voltage divider 80 is manually set so that this voltage divider delivers its maximum voltage output. The adjustable tap 81 of the voltage divider 60 is manually set to deliver zero voltage output. The adjustable resistors 75 and 76 of the phase shifting bridge 72 are now varied so as to adjust the phase of the tube grid circuits (activated through the grid control transformer 50) in respect to the phase of the tube plate circuits (activated through the coil 32), to cause a minimum or very little current to flow through the tubes and through the direct current supply lines 22 and 23 of the saturable reactors. During this phase set-up adjustment of the tube grid circuits, the voltage of the grid circuits remains unchanged, and the plate circuit current control is effected in accordance with known thyratron principles of operation whereby the tube firing point and resultingly the plate circuit current flow may be adjusted and controlled by the phase relation between the plate and grid circuits.

The adjustable tap 81 of the voltage divider 60 may now be adjusted to produce a substantial output voltage, and the variable resistors 66 and 67 of the phase shifting bridge 63 are adjusted so that the output from the voltage divider 60 is in opposition or 180° out of phase in respect to the output circuit of the voltage divider 80. An oscilloscope may be used, for example, in making this adjustment. With the adjustments made as described, the voltage applied to the primary 55 of the grid control transformer 50, and resultingly the voltage applied to the tube grid circuits will constitute the arithmetic difference of the opposing voltages from the outputs 60 and 80. Assuming the output voltage from the divider 80 to be the greater, it will be seen that by increasing the voltage output of the divider 60, the resultant voltage applied to the grid control transformer 50 and to the tube grid circuits will be decreased, but without phase variation. This variation in the tube grid circuit voltage may be employed to control the flow of the tube plate circuit current in accordance with the known principles of thyratron "A. C. amplitude control" as described in various textbooks, for example page 283 and Figs. 9–40 of "Principles of Electron Tubes," by Herbert J. Reich, McGraw-Hill, 1941. In the circuit set forth, the greater the grid voltage, the less will be the current flow through the tube plate circuits and through the supply lines 22 and 23 to the direct current coils of the saturable reactors.

If a driven load is now placed on the motor 10, and the short circuit in the leads 12 removed, the motor will slow down to a predetermined operating speed, due to the increased load and to the inductance of the saturable reactors now placed in the external rotor circuit. In the operation of the structure, if the load upon the motor 10 should be increased, the motor tends to slow down, resulting in a slowing down of the tachometer generator or governor 90. This in turn tends to decrease the output voltage of the divider 80 which is powered by the governor, resulting in a decreased voltage in the tube grid circuits, which in turn increases the current flow within the supply lines 22 and 23 to the direct current coils of the saturable reactors. The increased current in the direct current reactor coils reduces the inductance of the reactor alternating current coils 13a, 13b and 13c, thus tending to increase the speed of the motor, or increase the torque thereof, to carry the additional load. Similar but opposite action takes place in the event of a decreased motor driving load; the control circuit thus acting as a governor tending to maintain the operating speed of the motor 10 substantially constant, upon load variation. Speed variation or control of the motor may be effected by adjusting the manual tap 81 of the divider 60. Such adjustment varies the voltage output of the divider 60 opposing the voltage output of the divider 80 which is in turn powered by the governor device 90; thereby changing the speed requirements of the governor necessary to apply the proper grid voltage to the tubes, and resultingly the proper impedance, corresponding to the load, in the external motor control circuit. The manual control handle of the voltage divider 60 thus constitutes a motor speed controller in the system.

Preferably and to secure overall maximum efficiency, the motor 10 should not be operated over extended periods at unduly low speed, and it is further desirable that at least some substantial load shall be applied at all times to the motor during operation.

Due to the fact that a small current flow within the reactor supply lines 22 and 23 may be employed to effect the control of the relatively larger current capacity of the motor 10, low current capacity control tubes 30 and 31 may be employed. Further, inasmuch as the controller 90 is employed only to control the grid circuit of the tubes, the controller may conviently be a small, low capacity unit, applied at any convenient location to the motor drive shaft or geared therewith. A compact and relatively simple, sensitive control circuit is provided, which may be utilized to control the speed of the motor 10 smoothly and with accuracy. The tachometer generator or governor device 90 provides an alternating current output which is at all times maintained at the same frequency as that of the principal power lines, but wherein the voltage is proportional to the speed of the motor to be controlled, and which is utilized to effect the grid circuit control of the tubes. The controller 90, being directly mechanically coupled to the motor 10, at all times has its speed interlocked therewith, auxiliary speed control devices and circuits being unnecessary.

It is obvious that various changes may be made in the specific embodiment set forth without departing from the spirit of the invention. The invention is accordingly not to be limited to the specific embodiment shown and described, but only as indicated in the following claims.

The invention is hereby claimed as follows:

1. A speed control system for alternating current motors adapted to be powered from an alternating current source of supply comprising a control circuit for the motor to be controlled, said control circuit being energized by said alternating current supply source, a saturable core reactor disposed in the motor control circuit for controlling the impedance thereof, a direct current circuit for the reactor, a variable current source for controlling current flow within the reactor control circuit, and means for controlling the variable current source comprising an electical generator having a variable voltage alternating current output circuit and adapted to be driven in accordance with the speed of operation of the motor, the frequency of said generator output circuit being proportional to the frequency of the source of supply whereby to provide a predetermined phase relation between the generator output and the alternating current of the control circuit, and the voltage of the generator output circuit being proportional to the driven speed of the generator, and means controlled in accordance with the voltage of the generator output circuit for controlling the operation of said variable current source.

2. A speed control system for alternating current motors comprising an alternating current motor control circuit for the motor to be controlled, a reactor disposed in the motor control circuit for controlling the impedance thereof, a direct current control circuit for the reactor, a variable current source for contolling current flow within the reactor control circuit, an alternating current control circuit for controlling the variable current source, and means comprising a variable voltage generator driven by the motor and a manually adjustable voltage divider operable at similar frequencies for controlling the output thereof for varying the voltage of said last named circuit to thereby effect the control of said variable current source.

3. A speed control system for alternating current motors adapted to be powered from an alternating current source of supply comprising a motor control circuit for the motor to be controlled, a saturable core reactor disposed in the motor control circuit for controlling the impedance thereof, a control circuit for the reactor, a variable current source for controlling current flow within the reactor control circuit, an alternating current control circuit for controlling the variable current source, a manually adjustable voltage divider powered by the alternating current source of supply for varying the voltage of said last named circuit, and a controller generator driven in accordance with the speed of operation of the motor for also varying the voltage of said last named circuit to thereby effect the control of said variable current source, the output circuit of the controller generator having a frequency corresponding to that of said source of supply and a voltage proportional to the speed of operation of said generator.

4. A speed control system for alternating current motors adapted to be powered from an alternating current source of supply comprising a motor control circuit for the motor to be controlled, a reactor disposed in the motor control circuit for controlling the impedance thereof, a control circuit for the reactor, a variable current source for controlling current flow within the reactor control circuit, an alternating current control circuit responsive to voltage and phase adjustment for controlling the variable current source, a manually adjustable voltage divider for varying the voltage of said last named circuit, a controller generator driven in accordance with the speed of operation of the motor for also varying the voltage of said last named circuit, the output circuit of the controller generator having a frequency corresponding to that of said source of supply and a voltage proportional to the speed of operation of said generator, and phase shifting means for controlling the phase of the output of the voltage divider and of the output circuit of said governor generator.

5. A speed control system for alternating current motors adapted to be powered from an alternating current source of supply comprising a motor control circuit for the motor to be controlled, a saturable reactor disposed in the motor control circuit for controlling the impedance thereof, a tube plate circuit for controlling the reactor, a variable grid control circuit responsive to phase and voltage for controlling the tube plate circuit, and means for controlling the phase and voltage of the grid circuit comprising an alternating current generator the voltage output of which is proportional to its speed of operation, means for interlocking the frequency of the generator output circuit with the frequency of the source of supply, and means for adjusting the phase relation between the generator output circuit and the source of supply to thereby control the output phase.

6. A speed control system for alternating current motors adapted to be powered from an alternating current source of supply comprising a control circuit for the motor to be controlled, said control circuit being energized by said alternating current supply source, a reactor disposed in the motor control circuit for controlling the impedance thereof, a control circuit for the reactor, a variable current source for controlling current flow within the reactor control circuit, and means for controlling the variable current source comprising an electrical generator having a variable voltage alternating current output circuit and adapted to be driven in accordance with the speed of operation of the motor, the frequency of said generator output circuit being proportional to the frequency of the source of supply whereby to provide a predetermined phase relation between the generator output and the alternating current of the control circuit, and the voltage of the generator output circuit being proportional to the driven speed of the generator, and means controlled in accordance with the voltage of the generator output circuit for controlling the operation of said variable current source.

LEANDER JACKSON BULLIET.

REFERENCES CITED

The following references are of record in the file of this patent:

UNITED STATES PATENTS

| Number | Name | Date |
|---|---|---|
| Re. 19,853 | Stansbury | Feb. 11, 1936 |
| 1,411,862 | Meyer | Apr. 12, 1922 |
| 1,420,858 | Meyer | June 27, 1922 |
| 1,503,213 | Stoekle | July 29, 1924 |
| 1,603,137 | Meyer | Oct. 12, 1926 |
| 1,669,518 | Higbee | May 15, 1928 |
| 1,695,035 | Stoller | Dec. 11, 1928 |
| 1,930,279 | Morton | Oct. 10, 1933 |
| 2,102,911 | Perry | Dec. 21, 1937 |
| 2,202,172 | Stoller | May 28, 1940 |
| 2,206,920 | Riggs | July 9, 1940 |
| 2,287,459 | Uehling | June 23, 1942 |
| 2,335,860 | Kauffmann | Dec. 7, 1943 |
| 2,386,581 | Wickerham | Oct. 9, 1945 |

Certificate of Correction

Patent No. 2,528,467 October 31, 1950

LEANDER JACKSON BULLIET

It is hereby certified that error appears in the printed specification of the above numbered patent requiring correction as follows:

Column 6, line 55, before the word "circuit" insert *control*; column 8, line 50, list of references cited, for "Apr. 12, 1922" read *Apr. 4, 1922*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*